United States Patent
Maximovich et al.

[15] 3,677,330
[45] July 18, 1972

[54] METHOD OF MANUFACTURING BIMETALLIC ROTORS EMPLOYED IN ELECTRIC MACHINES

[72] Inventors: Boleslav Ivanovich Maximovich; Daniil Andreevich Duoko; Nikolai Georgievich Agafonov; Igor Petrovich Maximov, all of Kiev; Vadim Grigorievich Andreev, Moscow; Nikolai Yakovlevich Lepilov, Moscow; Alexei Kapitonovich Svinov, Moscow; Alexandr Borisovich Slonimsky, Moscow; Boris Zakharovich Volk, Moscow; Alexandr Ivanovich Gubin, Moscow; Berta Osipovna Katsman, Moscow, all of U.S.S.R.

[73] Assignee: Institut Elektrosvarki imeni E.O. Patona ul. Gorkogo, Kiev, U.S.S.R.

[22] Filed: April 24, 1969

[21] Appl. No.: 818,897

[52] U.S. Cl. ................................164/108, 148/3, 164/80, 164/71, 164/128, 164/DIG. 10
[51] Int. Cl. ........................................................B22d 19/00
[58] Field of Search...................164/80, 110, 108, DIG. 10

[56] References Cited

UNITED STATES PATENTS

| | | | |
|---|---|---|---|
| 1,217,581 | 2/1917 | Eldred | 164/80 |
| 2,066,247 | 12/1936 | Brownback | 164/80 |
| 2,277,571 | 3/1942 | Wagner | 164/80 X |
| 3,322,183 | 5/1967 | Johnston et al. | 164/80 X |
| 2,461,765 | 2/1949 | Olt | 164/80 |
| 3,156,015 | 11/1964 | Harrison | 164/80 |

*Primary Examiner*—J. Spencer Overholser
*Assistant Examiner*—V. K. Rising
*Attorney*—Waters, Roditi, Schwartz & Nissen

[57] ABSTRACT

A bimetallic rotor is manufactured by incorporating in a mold magnetically conducting metal members separated by spaces and filling the spaces in the mold with a magnetically non-conducting metal. The mold is then heated to a temperature to melt the magnetically non-conducting metal over a period of time for a complete diffusion of the metals. Thereafter the metals are cooled to a temperature at which the magnetically non-conducting metal solidifies with oriented crystallization.

5 Claims, 4 Drawing Figures

PATENTED JUL 18 1972 3,677,330
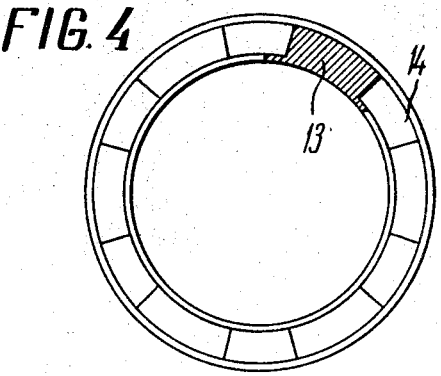
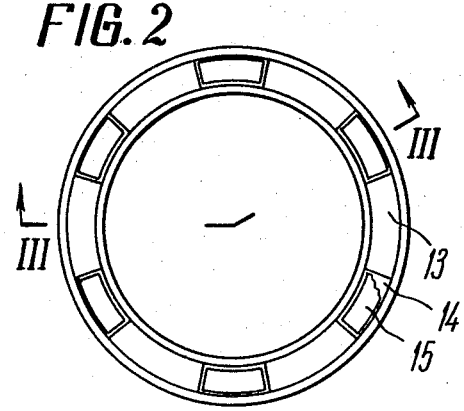
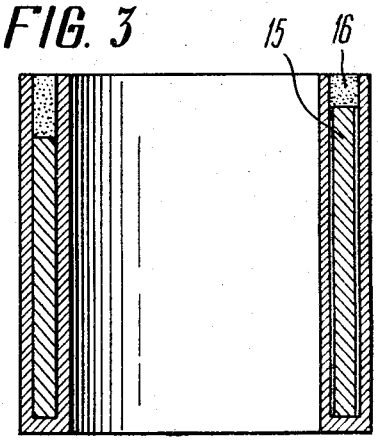

METHOD OF MANUFACTURING BIMETALLIC ROTORS EMPLOYED IN ELECTRIC MACHINES

The present invention relates generally to the field of manufacturing electrical machines and more particularly to the manufacture of rotors used in electrical machines.

At present bimetallic rotors are manufactured by welding two metals together such as a magnetically conducting metal and one that is magnetically non-conducting (cf. "Electrical Machines with Constant Magnets," by V.A.Balagurov et al, "Energiya" (Energy), 1964, USSR).

The abovementioned method of manufacturing the rotors features the following disadvantages: high labor-consumption associated with large amount of manual operations; low quality of bimetallic rotors manufactured due to the fact that a wide and nonuniform transient zone between the magnetically conducting and magnetically non-conducting metals is formed in the process of welding, as well as the impossibility of manufacturing rotors of complicated shape, such as claw-shaped rotors.

It is a primary object of the present invention to eliminate the abovementioned disadvantages.

The main object of the present invention is to provide a method of manufacturing bimetallic rotors accompanied by a diffusion process of interconnecting the magnetically conducting and magnetically non-conducting component members of the rotors involved.

Said object is accomplished by making use of a mold incorporating component members constituted of magnetically conducting metals and spaced apart, filling said mold with magnetically non-conducting metal and then heating the mold to a temperature above the melting point of the magnetically non-conducting metal over the time required for the diffusion between the metals involved to be terminated whereupon said mold is cooled to effect solidification of the magnetically conducting metal in question.

It is expedient that cooling of the mold be so accomplished that a temperature gradient be provided in the melted metal that will ensure oriented crystallization thereof.

It is desirable that a mold containing the melted metal be vibrated during the process of metal diffusion. It is likewise possible to take a mold incorporating the component members made of magnetically conducting metal and spaced apart and fill it with a magnetically non-conducting metal.

The herein-disclosed method is carried into effect by resorting to a device comprising a hollow vibrator within which is accommodated a cooling means which is mounted for displacement in the longitudinal direction, and a hollow heater whose internal space is adapted for setting of a mold which is to be placed at the upper end face of the vibrator.

It is expedient to use a single-turn inductor as a heater, said inductor being made of a thick-walled copper tube provided with channels for flow of cooling water.

Investigations have shown that bimetallic rotors manufactured according to the herein-disclosed method with recourse to the device adapted for carrying said method into effect feature decreased labor-consumption and highly reliable interconnections of magnetically conducting and magnetically non-conducting component members with an accurate transient zone.

When manufacturing rotors according to the hereinabove mentioned method, a dense and small-grain structure of the magnetically non-conducting metal in question is provided.

The present invention will be described hereinbelow by way of illustration of an exemplary embodiment thereof with due reference to the accompanying drawings wherein:

FIG. 2 shows a mold of a bimetallic rotor with component members made of magnetically nonconducting metal embedded into said mold (top view);

FIG. 3 shows the same as shown in FIG. 2 (sectional view on the III—III of FIG. 2), and FIG. 4 shows the mold of a bimetallic rotor manufactured of a magnetically conducting metal (top view).

Figure 1:
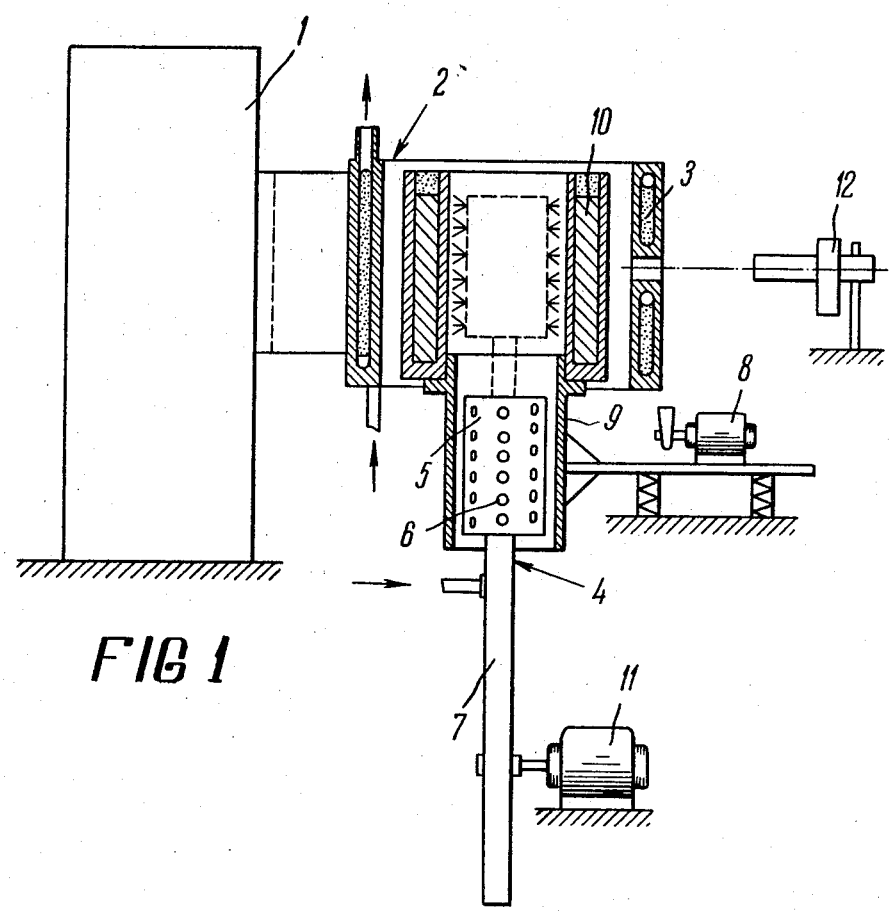
FIG 1 shows an arrangement for manufacturing bimetallic rotors, according to the invention (schematic drawings)

The arrangement for manufacturing bimetallic rotors (FIG. 1) comprises: a post 1 comprising a power source; a single-turn inductor 2 made of thick-walled copper tubing provided with channels 3 through which circulates a cooling liquid, mainly water; a cooling means 4 which is essentially a sprinkler 5 featuring a plurality of vertically arranged orifices 6, said sprinkler being fixed in position on a hollow rod 7; a vibrator 8 operatively connected with a base 9 adapted for mounting a mold 10; a drive 11 provided for the purpose of displacing the cooling means, and a radiation pyrometer 12 adapted for controlling the temperature in the process of manufacturing the rotors.

A rotor (FIG. 1) is manufactured according to the procedure described hereinbelow.

The mold 10 is placed on the base 9, said mold accommodating the component members 13 (FIGS. 2 and 3) made of magnetically conducting metal, whereas the spaces 14 provided therebetween are filled with magnetically non-conducting metal 15 and a flux 16 (the mold may be made completely of magnetically conducting metal (refer to FIG. 4), in this particular case the component members 13 being essentially the blank of the magnetically conducting component members of the rotor under manufacture).

Thereafter the post 1 is actuated and the mold 10 is uniformly heated.

After a certain period of time the flux 16 is melted and fills the spaces between the magnetically conducting metal 13 and magnetically non-conducting metal 15, whereupon the magnetically non-conducting metal 15 is melted, which, forcing out the flux, fills the spaces 14, thereby wetting the walls of component members 13 made of magnetically conducting metal.

Then the vibrator is actuated and the herein-described operational condition is maintained until the process of diffusion between the metals involved is completed.

Oscillatory motion which is imparted to the mold by the hereinabove-mentioned vibrator adds to rapid degassing of the melted metal and purification thereof from magnetically non-conducting components.

After that the vibrator 8 is switched off, the sprinkler 5 is introduced into the mold 10, the intensity of current supplied to the inductor 2 is reduced and water is delivered through the hollow rod 7.

The water delivered through the orifices 6 is supplied to those portions of the mold internal wall which are in contact with the melted metal.

Water cooling of the mold from the inside with simultaneous heating thereof from the outside provides for a temperature gradient in the melted metal which ensures oriented crystallization thereof.

On the completion of the crystallization process of the magnetically non-conducting metal and transition thereof into solid state, the post is switched off and delivery of water into the cooling means is terminated whereas the rotor blank thus obtained is removed so as to be subjected to further treatment.

In some cases for increasing the strength of the finished product the rotor blank is subjected to special heat treatment whose operational conditions are determined by the properties of the metals constituting the composition of the rotor under manufacture.

For example, in case of a bimetallic rotor constituted of magnetically conductive steel and an alloy based upon copper-nickel-manganese (magnetically non-conducting portion), the heat treatment consists in hardening at a temperature of 850° C and quenching on oil, tempering from at a temperature of 550°–600° C and quenching in oil, ageing at a temperature of 430° C for 20 hours and subsequent cooling in the air.

Such heat treatment ensures utmost magnetic properties of the magnetically conducting portion of the rotor with a ultimate tensile strength of the entire bimetallic rotor of the order of 100 kg/mm$^2$.

We claim:

1. A method of manufacturing bimetallic rotors employed in electric machines, said method comprising providing an annular mold containing magnetically-conducting metal members separated by spaces, filling said spaces in the mold with a magnetically non-conducting metal, heating the mold to a temperature to melt the magnetically non-conducting metal over a period of time for a complete diffusion process of interconnecting of the metals, and cooling the metals by spraying the inner surface of the mold with a coolant to a temperature at which the magnetically non-conducting metal solidifies with oriented crystallization.

2. A method as claimed in claim 1 wherein said cooling is effected at a temperature gradient to effect the oriented crystallization of the solidified non-conducting metal.

3. A method as claimed in claim 1 wherein said mold itself constitutes the magnetically conducting metal members and is steel, said magnetically non-conducting metals being an alloy of copper which is dispersion hardening, and comprising tempering, annealing and ageing the resulting article after the cooling step.

4. A method as claimed in claim 1 comprising vibrating said mold during the diffusion of the metals.

5. A method as claimed in claim 1 wherein said mold is annular in shape, said heating being effected externally of said mold while said cooling is effected internally of said mold.

* * * * *